United States Patent
Itai et al.

(10) Patent No.: US 12,557,560 B2
(45) Date of Patent: Feb. 17, 2026

(54) SWITCHING ELEMENT AND STORAGE DEVICE

(71) Applicant: KIOXIA CORPORATION, Tokyo (JP)

(72) Inventors: Shogo Itai, Kawasaki Kanagawa (JP); Kazuya Matsuzawa, Kamakura Kanagawa (JP); Masahiko Nakayama, Kuwana Mie (JP); Hiroyuki Kanaya, Yokkaichi Mie (JP); Hideyuki Sugiyama, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 594 days.

(21) Appl. No.: 17/898,812

(22) Filed: Aug. 30, 2022

(65) Prior Publication Data
US 2023/0189661 A1 Jun. 15, 2023

(30) Foreign Application Priority Data

Dec. 15, 2021 (JP) .................... 2021-203411

(51) Int. Cl.
*H10N 50/85* (2023.01)
*G11C 5/08* (2006.01)
*H10B 61/00* (2023.01)
*H10N 50/80* (2023.01)

(52) U.S. Cl.
CPC ............ *H10N 50/85* (2023.02); *G11C 5/08* (2013.01); *H10B 61/00* (2023.02); *H10N 50/80* (2023.02)

(58) Field of Classification Search
CPC ......... H10B 63/80; H10B 63/22; H10B 61/10
See application file for complete search history.

(56) References Cited

U.S. PATENT DOCUMENTS

| | | |
|---|---|---|
| 9,029,192 B1 | 5/2015 | Hsueh |
| 2014/0377931 A1 | 12/2014 | Tendulkar et al. |
| 2016/0118442 A1* | 4/2016 | Kim ............. H10B 63/20 711/147 |
| 2017/0186812 A1 | 6/2017 | Lee |
| 2017/0352807 A1* | 12/2017 | Ha ............. H10N 70/883 |
| 2018/0012652 A1 | 1/2018 | Yang et al. |

(Continued)

FOREIGN PATENT DOCUMENTS

| | | |
|---|---|---|
| JP | 2021-144968 A | 9/2021 |
| TW | 201724469 A | 7/2017 |

OTHER PUBLICATIONS

Chinese Office Action mailed Dec. 18, 2025 in corresponding Chinese Patent Application 202211602799.2 with English Translation, 13 pages.

*Primary Examiner* — Shih Tsun A Chou
(74) *Attorney, Agent, or Firm* — Kim & Stewart LLP

(57) ABSTRACT

A switching element includes a first conductive layer, a second conductive layer, and a switching material layer provided between the first conductive layer and the second conductive layer and formed of an insulating material containing an additional element. The switching material layer includes a first interface region including a first interface between the first conductive layer and the switching material layer and a second interface region including a second interface between the second conductive layer and the switching material layer. A concentration of the additional element in the switching material layer has a first peak in the first interface region.

20 Claims, 12 Drawing Sheets

(56) References Cited

U.S. PATENT DOCUMENTS

| | | |
|---|---|---|
| 2018/0047784 A1 | 2/2018 | Ohba et al. |
| 2018/0277601 A1 | 9/2018 | Ahn et al. |
| 2021/0036221 A1 | 2/2021 | Ohba et al. |
| 2021/0111224 A1 | 4/2021 | Cheng et al. |
| 2021/0183945 A1* | 6/2021 | Song .................... H10N 70/841 |
| 2021/0288253 A1 | 9/2021 | Kumura |

* cited by examiner

SWITCHING ELEMENT AND STORAGE DEVICE

CROSS-REFERENCE TO RELATED APPLICATION(S)

This application is based upon and claims the benefit of priority from Japanese Patent Application No. 2021-203411, filed Dec. 15, 2021, the entire contents of which are incorporated herein by reference.

FIELD

Embodiments described herein relate generally to a switching element and a storage device.

BACKGROUND

A storage device in which memory cells each including a variable resistance storage element, such as a magnetoresistance effect element, and a selector (e.g., a switching element) are integrated on a semiconductor substrate is proposed.

DETAILED DESCRIPTION

Embodiments provide a storage device including a switching element having excellent characteristics.

In general, according to one embodiment, the switching element includes a first conductive layer, a second conductive layer, and a switching material layer provided between the first conductive layer and the second conductive layer and formed of an insulating material containing an additional element. The switching material layer includes a first interface region including a first interface between the first conductive layer and the switching material layer and a second interface region including a second interface between the second conductive layer and the switching material layer. A concentration of the additional element in the switching material layer has a first peak in the first interface region.

Hereinafter, embodiments will be described with reference to the drawings.

First Embodiment

Figure 1:
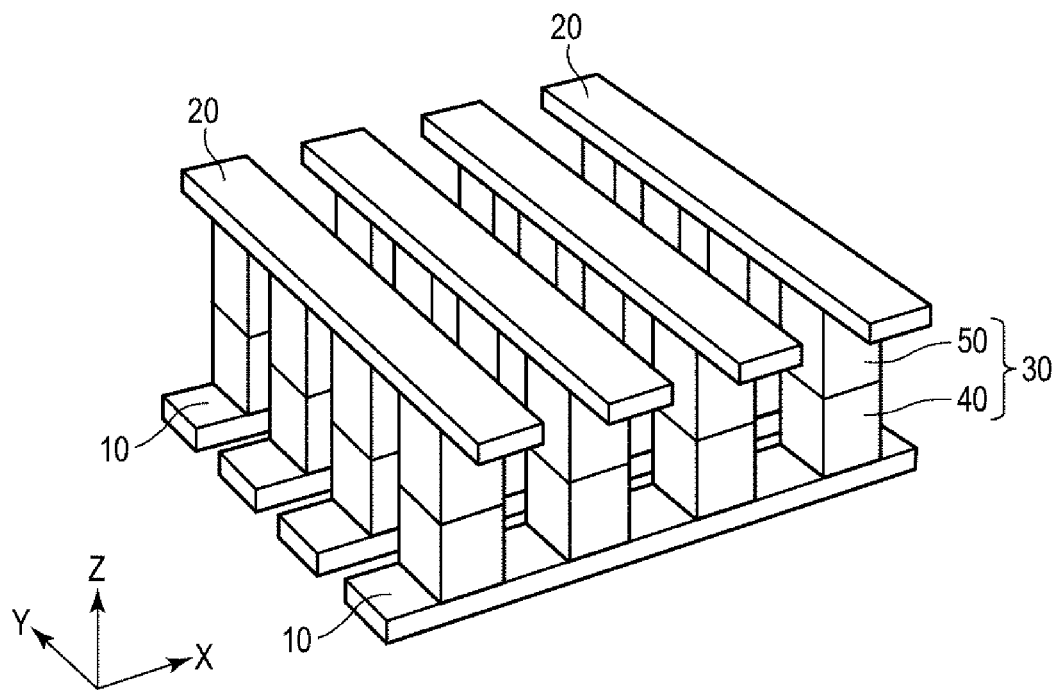
FIG. 1 is a perspective view schematically showing a configuration of a storage device according to a first embodiment.

FIG. 1 is a perspective view schematically showing a configuration of a storage device according to the present embodiment.

The storage device shown in FIG. 1 is a non-volatile storage device, and includes a plurality of first wires 10, a plurality of second wires 20, and a plurality of memory cells 30 connected between the plurality of first wires 10 and the plurality of second wires 20.

Each of the first wires 10 extends in an X direction, and each of the second wires 20 extends in a Y direction. One of the first wire 10 and the second wire 20 corresponds to a word line, and the other of the first wire 10 and the second wire 20 corresponds to a bit line. The X direction, the Y direction, and a Z direction shown in FIG. 1 are directions intersecting one another. Specifically, the X direction, the Y direction, and the Z direction are orthogonal to one another.

Each of the memory cells 30 includes a magnetoresistance effect element 40 that functions as a variable resistance storage element and a selector (e.g., switching element) 50 connected in series to the magnetoresistance effect element 40. One end of the memory cell 30 is connected to the first wire 10, and the other end of the memory cell 30 is connected to the second wire 20. A magnetic tunnel junction (MTJ) element is used as the magnetoresistance effect element 40.

By applying a predetermined voltage between the first wire 10 and the second wire 20, the selector 50 is in an on state, and writing and reading can be performed on the magnetoresistance effect element 40 connected in series to the selector 50.

In an example shown in FIG. 1, the magnetoresistance effect element 40 is provided on a lower layer side and the selector 50 is provided on an upper layer side, but the magnetoresistance effect element 40 may be provided on the upper layer side and the selector 50 may be provided on the lower layer side.

Figure 2:
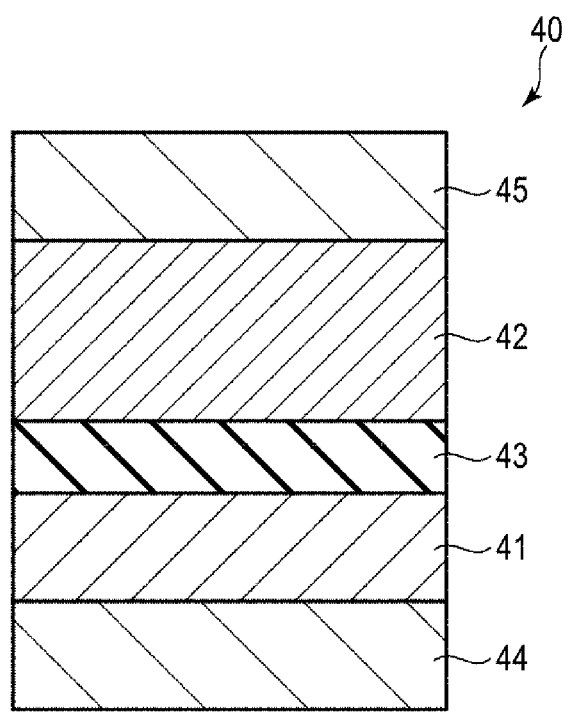
FIG. 2 is a cross-sectional view schematically showing a configuration of a magnetoresistance effect element according to the first embodiment.

FIG. 2 is a cross-sectional view schematically showing a configuration of the magnetoresistance effect element 40.

The magnetoresistance effect element 40 includes a storage layer 41, a reference layer 42, a tunnel barrier layer 43, an electrode 44, and an electrode 45, and has a stacked structure of the storage layer 41, the reference layer 42, and the tunnel barrier layer 43 provided between the electrode 44 and the electrode 45.

The storage layer 41 is a ferromagnetic layer having a variable magnetization direction. The variable magnetization direction means that the magnetization direction changes with respect to a predetermined write current. The reference layer 42 is a ferromagnetic layer having a fixed magnetization direction. The fixed magnetization direction means that the magnetization direction does not change with respect to the predetermined write current. The tunnel barrier layer 43 is a non-magnetic, insulating layer provided between the storage layer 41 and the reference layer 42.

When the magnetization direction of the storage layer 41 is parallel to the magnetization direction of the reference layer 42, the magnetoresistance effect element 40 is in a relatively low resistance state. When the magnetization direction of the storage layer 41 is antiparallel to the magnetization direction of the reference layer 42, the magnetoresistance effect element 40 is in a relatively high resistance state. Therefore, the magnetoresistance effect element 40 can store binary data in accordance with a resistance state. In addition, the low resistance state or the high resistance state can be set in the magnetoresistance effect element 40 in accordance with a direction of a current flowing through the magnetoresistance effect element 40.

Figure 3:
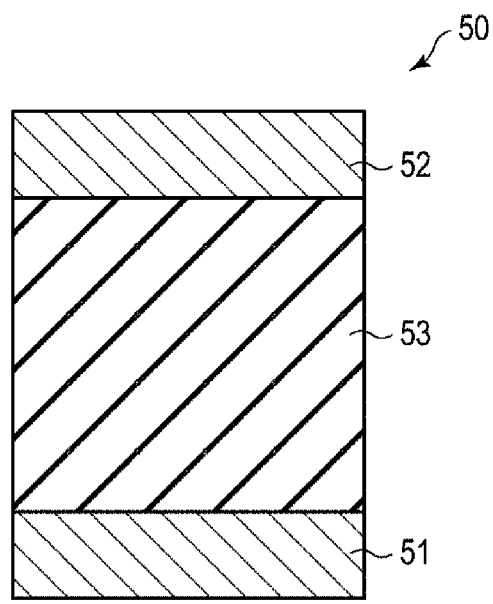
FIG. 3 is a cross-sectional view schematically showing a configuration of a selector according to the first embodiment.

FIG. 3 is a cross-sectional view schematically showing a configuration of the selector 50.

The selector 50 includes an electrode 51, an electrode 52, and a selector material layer (which is a switching material layer) 53, and the selector material layer 53 is provided between the electrode 51 and the electrode 52.

The electrode 51 and the electrode 52 are conductive layers and are formed of a conductive material. Specifically, the electrode 51 and the electrode 52 are formed of a metallic material.

The selector material layer 53 is formed of an insulating material containing an additional element. As the insulating material of the selector material layer 53, a silicon oxide containing silicon (Si) and oxygen (O), a zirconium oxide containing zirconium (Zr) and oxygen (O), or a silicon nitride containing silicon (Si) and nitrogen (N) is used. As the additional element of the selector material layer 53, germanium (Ge), arsenic (As), antimony (Sb), bismuth (Bi), titanium (Ti), tungsten (W), argon (Ar), xenon (Xe), or krypton (Kr) is used.

Figure 4A:
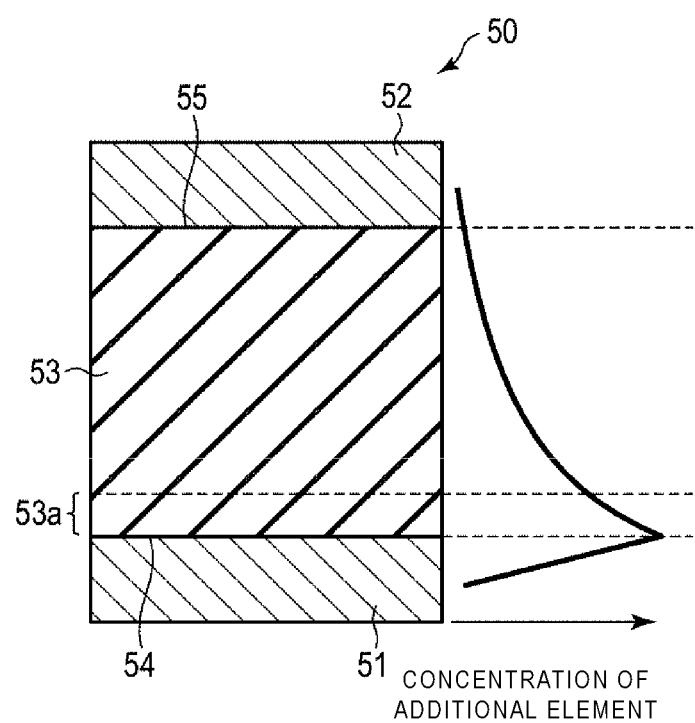
FIG. 4A is a diagram schematically showing a first example of concentration distribution of an additional element according to the first embodiment.
Figure 4B:
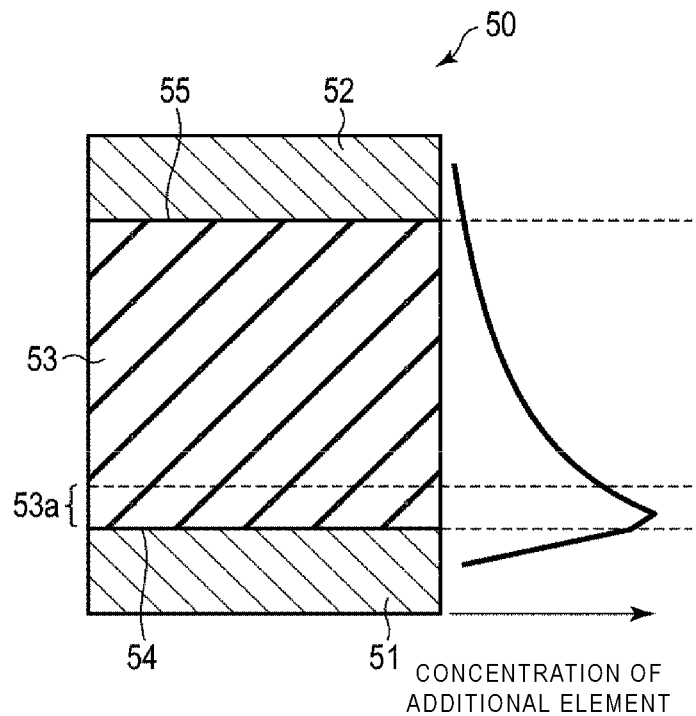
FIG. 4B is a diagram schematically showing a second example of the concentration distribution of the additional element according to the first embodiment.
Figure 4C:
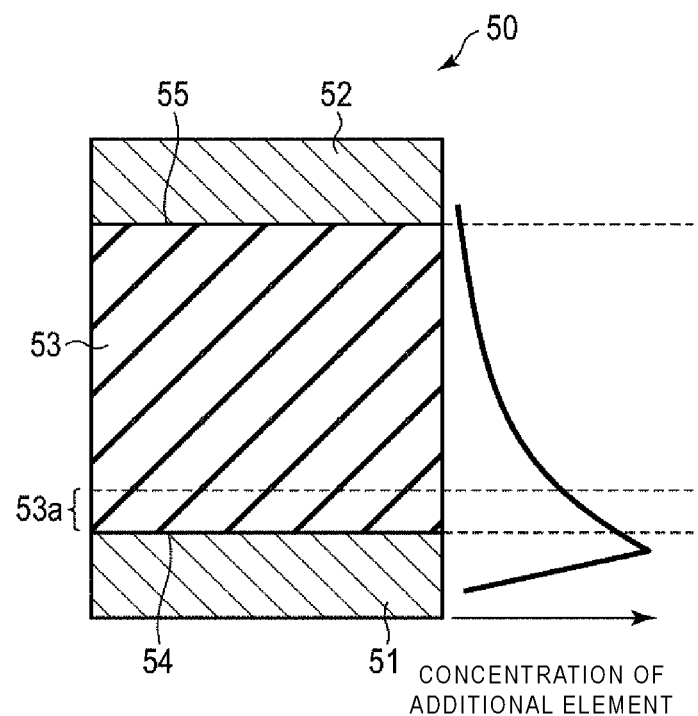
FIG. 4C is a diagram schematically showing a third example of the concentration distribution of the additional element according to the first embodiment.

FIGS. 4A, 4B, and 4C are diagrams schematically showing first, second, and third examples of concentration distribution of the additional element, respectively.

As shown in FIGS. 4A, 4B, and 4C, the additional element is not uniformly distributed, and the concentration of the additional element in the selector material layer 53 has a peak in an interface region 53a including an interface 54 between the electrode 51 and the selector material layer 53 and a region near the interface 54.

The concentration of the additional element in the selector material layer 53 decreases from the interface region 53a toward an interface 55 between the electrode 52 and the selector material layer 53. That is, the concentration of the additional element in the selector material layer 53 decreases from a peak concentration position in the interface region 53a toward the interface 55.

The interface region 53a is, for example, a region from a position of the interface 54 to a position at which a distance from the interface 54 is d/5, where d is a distance between the interface 54 and the interface 55. From a viewpoint of reducing a threshold voltage and a leak current of the memory cell 30, it is preferable that the peak concentration position in the interface region 53a is close to the interface 54 as described later with reference to FIG. 5.

In the example of FIG. 4A, the concentration of the additional element in the selector material layer 53 has a peak at the interface 54 between the electrode 51 and the selector material layer 53.

In the example of FIG. 4B, the concentration of the additional element in the selector material layer 53 has a peak in the region near the interface 54.

In the example of FIG. 4C, the concentration of the additional element in the selector material layer 53 has a peak at the interface 54 between the electrode 51 and the selector material layer 53. In the example of FIG. 4C, when the entire selector 50 is viewed, the concentration of the additional element has a peak in the electrode 51, and the concentration of the additional element in the selector material layer 53 has a peak at the interface 54 between the electrode 51 and the selector material layer 53.

As described above, in the present embodiment, the additional element is contained in the selector material layer 53 formed of the insulating material, and the concentration of the additional element in the selector material layer 53 has a peak in the interface region 53a including the interface 54 between the electrode 51 and the selector material layer 53 and the region near the interface 54. With such a configuration, in the present embodiment, the selector 50 in which both the threshold voltage and the leak current are reduced can be obtained as described below.

Figure 5:
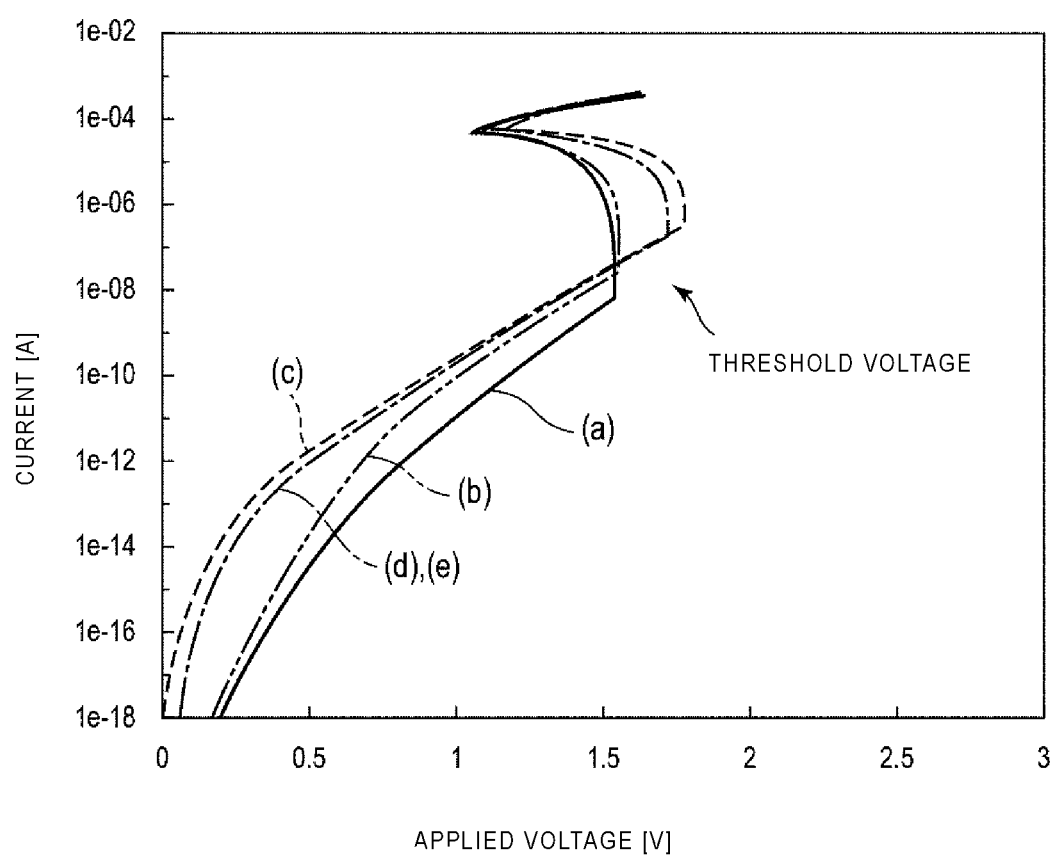
FIG. 5 is a diagram showing a relationship between an applied voltage to a memory cell and a current flowing through the memory cell according to the first embodiment.

FIG. 5 is a diagram showing a relationship between an applied voltage to the memory cell 30 including the magnetoresistance effect element 40 and the selector 50 connected in series to each other, and a current flowing through the memory cell 30.

In FIG. 5, a characteristic (a) is a case where a concentration peak of the additional element is present at the interface 54. A characteristic (b) is a case where the concentration of the additional element is higher than that of the characteristic (a) and the concentration peak of the additional element is present at the interface 54. A characteristic (c) is a case where the distance between the interface 54 and the interface 55 is d, and the concentration peak of the additional element is present at a position at which a distance from the interface 54 is d/2. A characteristic (d) is a case where the concentration peak of the additional element is present at a position at which a distance from the interface 54 is d/4. A characteristic (e) is a case where the concentration peak of the additional element is present at a position at which a distance from the interface 54 is 3d/4.

As can be seen from FIG. 5, in the characteristic (c), the threshold voltage of the memory cell 30 (a voltage at which the current flowing through the memory cell 30 rapidly increases) is the highest, and the leak current flowing through the memory cell 30 is also large. In the characteristics (d) and (e), both the threshold voltage and the leak current slightly decrease. In the characteristics (a) and (b), both the threshold voltage and the leak current greatly decrease.

As can be seen from the above, when the concentration of the additional element in the selector material layer 53 has a peak in the interface region 53a, the threshold voltage and the leak current of the memory cell 30 can be significantly reduced, that is, the threshold voltage and the leak current of the selector 50 can be significantly reduced. Reasons for this are considered to be as follows.

When the additional element is contained in the selector material layer 53, traps due to the additional element are generated in the selector material layer 53. Therefore, the interface region 53a has a relatively high trap density, and regions other than the interface region 53a have a relatively low trap density. In other words, the selector material layer 53 is considered to be a series connection of a low-resistance region having a relatively high trap density and a high-resistance region having a relatively low trap density. Therefore, resistance of the selector material layer 53 at a time of a low applied voltage is generally determined by resistance of the high-resistance region having a low trap density (the concentration of the additional element is low). Therefore, the current flowing through the selector 50 is limited by the region where the concentration of the additional element is low, and the leak current can be reduced.

When a voltage is applied to the selector 50, a relatively high voltage is applied to the high-resistance region where the concentration of the additional element is low. Therefore, a high electric field is applied to the high-resistance region where the concentration of the additional element is low, and switching from an off state to an on state is relatively easily started in the high-resistance region where the concentration of the additional element is low. When the high-resistance region transitions from the off state to the on state, a voltage is also efficiently applied to the low-resistance region where the concentration of the additional element is high. Therefore, switching from the off state to the on state is relatively easily performed even in the low-resistance region where the concentration of the additional element is high. As a result, it is considered that the threshold voltage of the selector 50 is reduced.

As described above, in the present embodiment, the threshold voltage and the leak current of the selector 50 can be reduced, and a non-volatile storage device having an excellent performance can be obtained.

Figure 6A:
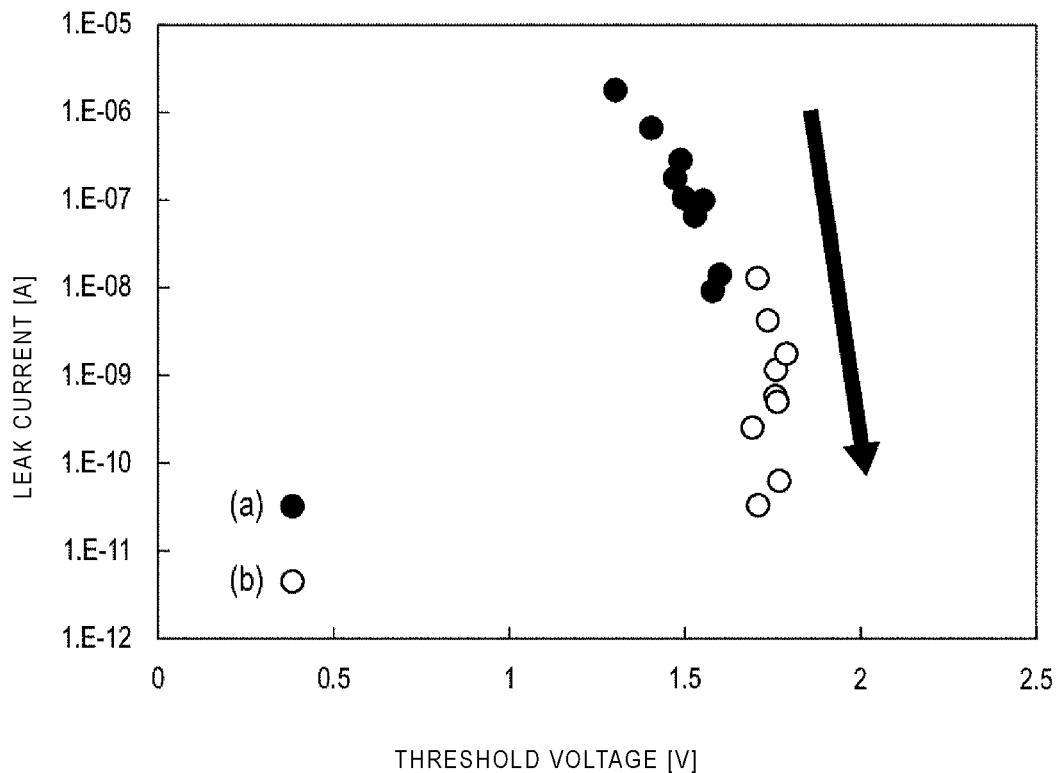
FIG. 6A is a diagram showing a relationship between a threshold voltage and a leak current of the memory cell when a concentration of the additional element is changed according to the first embodiment.
Figure 6B:
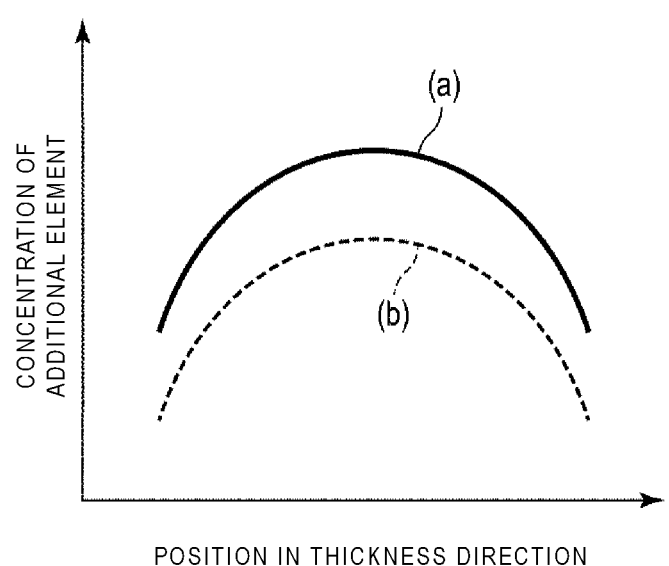
FIG. 6B is a diagram showing concentration distribution in a thickness direction of samples used in FIG. 6A according to the first embodiment.

FIG. 6A is a diagram showing a relationship between the threshold voltage and the leak current of the memory cell when the concentration of the additional element is changed. Here, a leak current when a half-selection voltage between a selection voltage and a non-selection voltage is applied to the memory cell is shown. FIG. 6B is a diagram showing concentration distribution in a thickness direction of samples used in FIG. 6A. The additional element is arsenic (As). A sample (a) has a peak concentration of $5 \times 10^{19}/cm^3$, and a sample (b) has a peak concentration of $2 \times 10^{19}/cm^3$.

As shown in FIG. 6A, in both samples (a) and (b), the threshold voltage increases as the leak current decreases. Therefore, it can be seen that even if the concentration of the additional element is changed, a tendency that the threshold voltage increases as the leak current decreases is not improved.

Figure 7A:
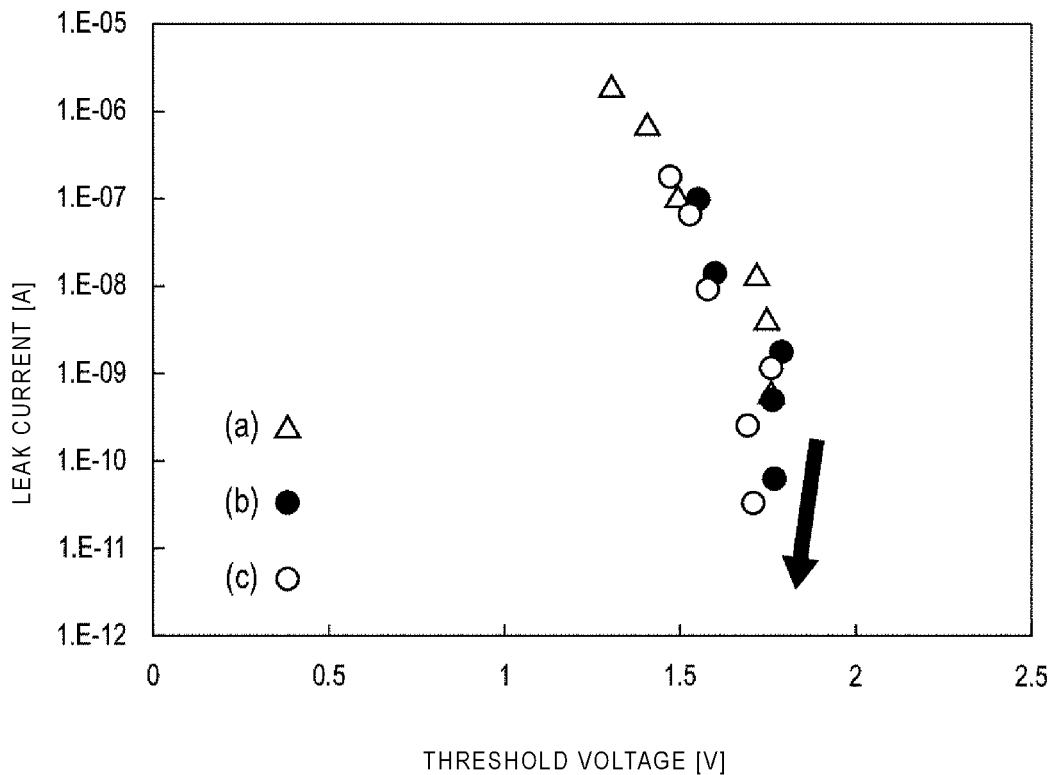
FIG. 7A is a diagram showing a relationship between the threshold voltage and the leak current of the memory cell when the concentration distribution of the additional element is changed according to the first embodiment.
Figure 7B:
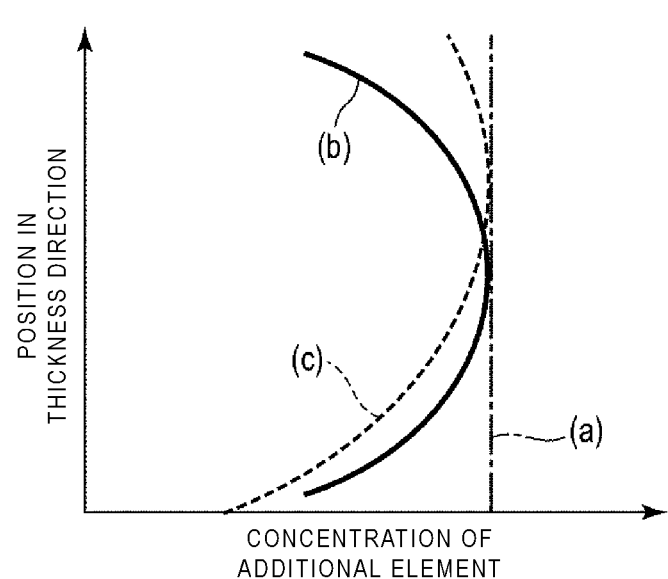
FIG. 7B is a diagram showing concentration distribution in a thickness direction of samples used in FIG. 7A according to the first embodiment.

FIG. 7A is a diagram showing a relationship between the threshold voltage and the leak current (a leak current when a half-selection voltage is applied) of the memory cell when the concentration distribution of the additional element is changed. FIG. 7B is a diagram showing concentration distribution in a thickness direction of samples used in FIG. 7A. The additional element is arsenic (As). A sample (a) shows a case where the concentration distribution of the additional element is uniform in a thickness direction of the selector material layer 53, a sample (b) shows a case where the concentration peak of the additional element is at a center in the thickness direction of the selector material layer 53, and a sample (c) shows a case where the concentration peak of the additional element is at a position shifted from the center in the thickness direction of the selector material layer 53 to a direction of the electrode 51 or the electrode 52.

As shown in FIG. 7A, in the sample (c), an increase in the threshold voltage is prevented to some extent even when the leak current decreases.

Figure 8A:
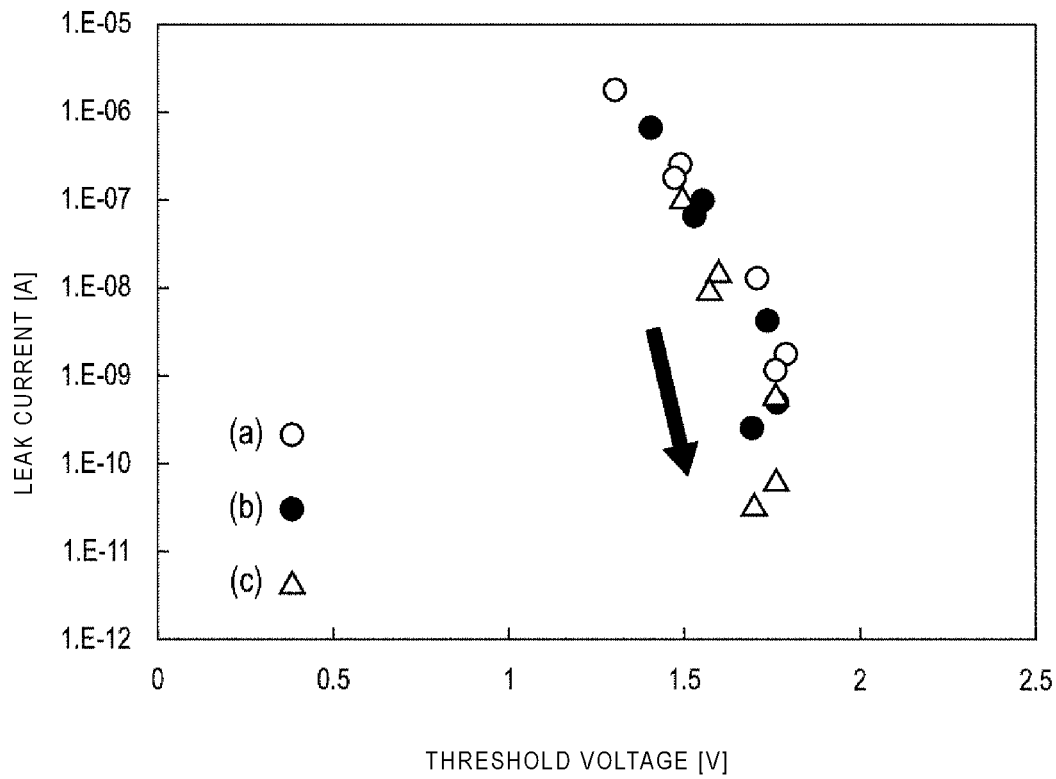
FIG. 8A is a diagram showing a relationship between the threshold voltage and the leak current of the memory cell when the concentration distribution of the additional element is changed according to the first embodiment.
Figure 8B:
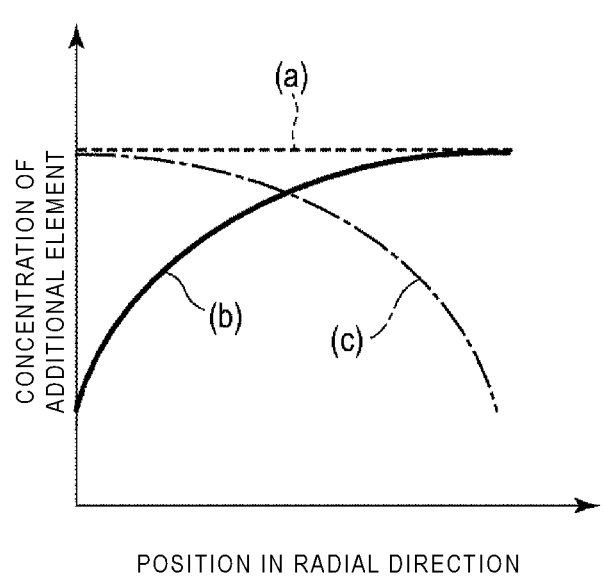
FIG. 8B is a diagram showing concentration distribution in a radial direction of samples used in FIG. 8A according to the first embodiment.

FIG. 8A is a diagram showing a relationship between the threshold voltage and the leak current (a leak current when a half-selection voltage is applied) of the memory cell when the concentration distribution of the additional element in a radial direction is changed. FIG. 8B is a diagram showing concentration distribution in a radial direction of samples used in FIG. 8A. The additional element is arsenic (As). A sample (a) shows a case where the concentration distribution of the additional element is uniform in a radial direction of the selector material layer 53, a sample (b) shows a case where the concentration of the additional element increases from the center toward an outer periphery in the radial direction of the selector material layer 53, and a sample (c) shows a case where the concentration of the additional element decreases from the center toward the outer periphery in the radial direction of the selector material layer 53.

As shown in FIG. 8A, it can be seen that there is no large difference in the relationship between the threshold voltage and the leak current even when the concentration distribution of the additional element in the radial direction is changed.

Figure 9:
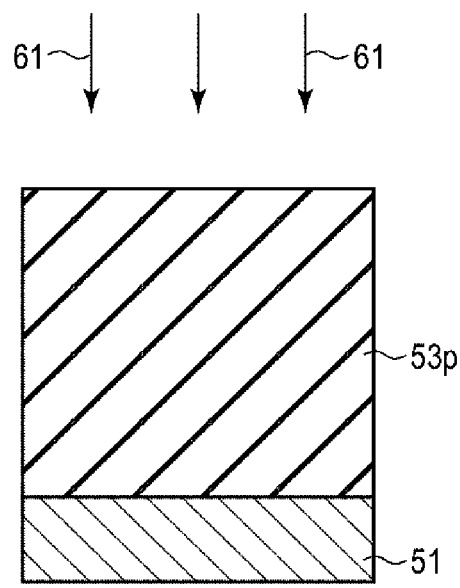
FIG. 9 is a diagram schematically showing a first example of a manufacturing method of the selector according to the first embodiment.

FIG. 9 is a diagram schematically showing a first example of a manufacturing method of the selector 50.

In the present manufacturing method, after the electrode 51 and a preliminary selector material layer 53p are formed, ion implantation of ions 61 as the additional element is performed from a preliminary selector material layer 53p side. At this time, an acceleration voltage of the ion implantation is adjusted such that the concentration peak of the additional element is obtained at an interface between the electrode 51 and the preliminary selector material layer 53p or near the interface. By forming the electrode 52 after the ion implantation, the selector 50 having the concentration distribution of the additional element as shown in FIG. 4A, 4B, or 4C is obtained.

In the above manufacturing method, the electrode 51 is preferably formed of metallic elements selected from cobalt (Co), molybdenum (Mo), ruthenium (Ru), tantalum (Ta), platinum (Pt), and tungsten (W). By using these metallic elements for the electrode 51, an average range of the ions as the additional element can be shortened. As a result, as shown in FIGS. 4A, 4B, and 4C, the concentration peak of the additional element in the selector material layer 53 can be positioned at the interface 54 between the electrode 51 and the selector material layer 53 or near the interface 54.

Figure 10:
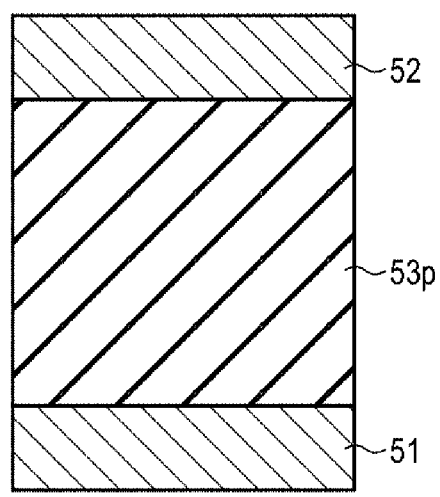
FIG. 10 is a diagram schematically showing a second example of the manufacturing method of the selector according to the first embodiment.

FIG. 10 is a diagram schematically showing a second example of the manufacturing method of the selector 50.

In the present manufacturing method, the additional element is contained in the electrode 51 in advance, and the additional element in the electrode 51 is diffused into the preliminary selector material layer 53p. Even by using such a method, the selector 50 having the concentration distribution of the additional element as shown in FIG. 4A, 4B, or 4C can be formed.

Figure 11A:
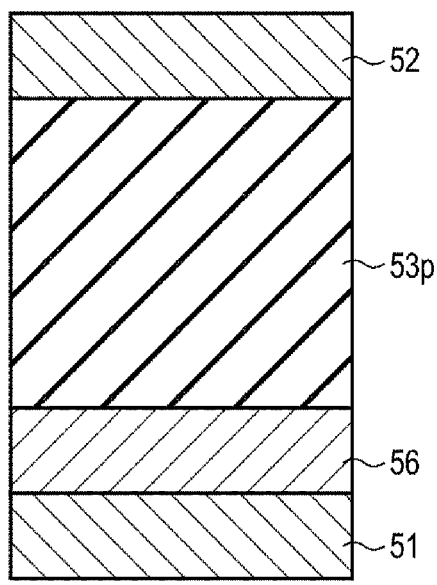
FIG. 11A is a diagram schematically showing a third example of the manufacturing method of the selector according to the first embodiment.
Figure 11B:
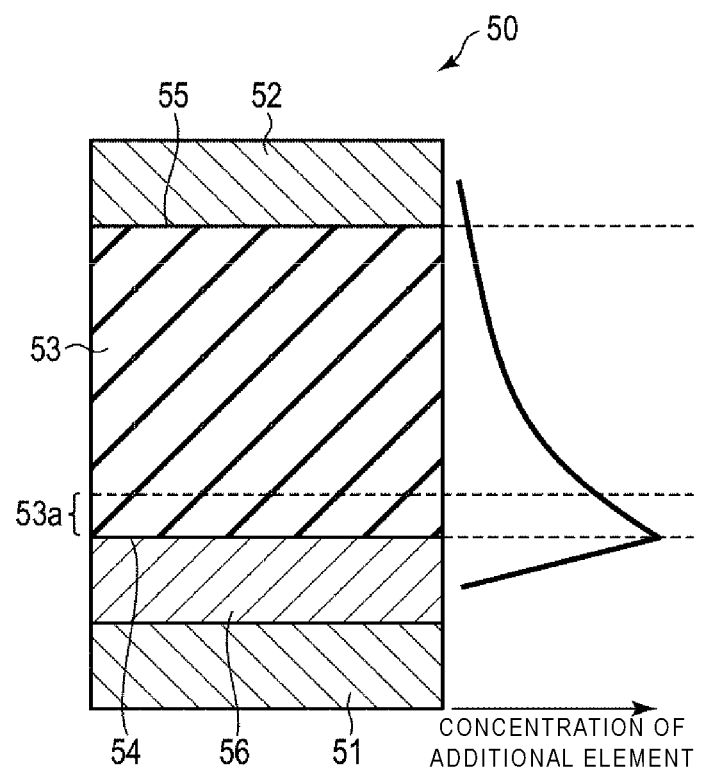
FIG. 11B is a diagram schematically showing the third example of the manufacturing method of the selector according to the first embodiment.

FIGS. 11A and 11B are diagrams schematically showing a third example of the manufacturing method of the selector 50.

In the present manufacturing method, as shown in FIG. 11A, an underlayer 56 containing an additional element is formed on the electrode 51, and the additional element in the underlayer 56 is diffused into the preliminary selector material layer 53p. The underlayer 56 is a conductive layer formed of a conductive material. In this manner, the additional element may be diffused from the underlayer 56 into the preliminary selector material layer 53p. By such a method, as shown in FIG. 11B, a structure is obtained in which the concentration of the additional element in the selector material layer 53 has a peak in the interface region 53a including the interface 54 between the underlayer (conductive layer) 56 and the selector material layer 53 and the region near the interface 54.

Figure 12:
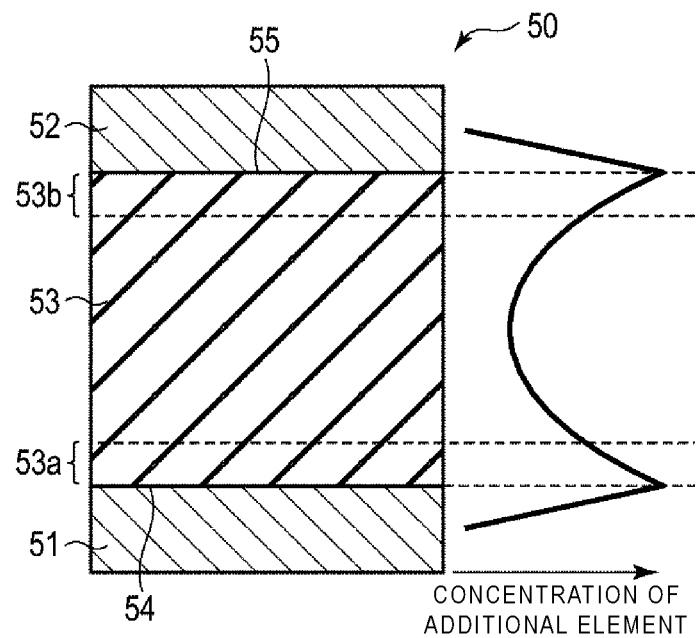
FIG. 12 is a cross-sectional view schematically showing a configuration of a modification of the selector and a diagram schematically showing the concentration distribution of the additional element according to the first embodiment.

FIG. 12 is a cross-sectional view schematically showing a configuration of a modification of the selector and a diagram schematically showing the concentration distribution of the additional element according to the present embodiment.

In the present modification, the concentration of the additional element in the selector material layer 53 has a peak in the interface region 53a including the interface 54 between the electrode (conductive layer) 51 and the selector material layer 53 and the region near the interface 54, and has a peak in an interface region 53b including the interface 55 between the electrode (conductive layer) 52 and the selector material layer 53 and a region near the interface 55.

The structure as described above can be obtained by adjusting the acceleration voltage of the ion implantation of the additional element similarly to the method described in the first example of the manufacturing method of FIG. 9. That is, the acceleration voltage of the ion implantation is adjusted such that the concentration peak of the additional element is obtained in the interface region 53a, and the acceleration voltage of the ion implantation is adjusted such that the concentration peak of the additional element is obtained in the interface region 53b. Alternatively, similarly to the method described in the second example of the manufacturing method of FIG. 10, the concentration peak of the additional element may be obtained in the interface region 53a and the interface region 53b by diffusing the additional element from the electrode 51 and the electrode 52.

As described above, even when the concentration of the additional element in the selector material layer 53 has peaks in both the interface region 53a and the interface region 53b, the threshold voltage and the leak current of the selector 50 can be reduced as in the above embodiment.

In the above description, the concentration distribution of the additional element in the thickness direction of the selector material layer 53 was mainly described, but the concentration distribution of the additional element may also be generated in a direction perpendicular to the thickness direction of the selector material layer 53. That is, the concentration of the additional element may not be uniformly distributed in a plane perpendicular to a direction from the electrode (conductive layer) 51 toward the electrode (conductive layer) 52.

Figure 13:
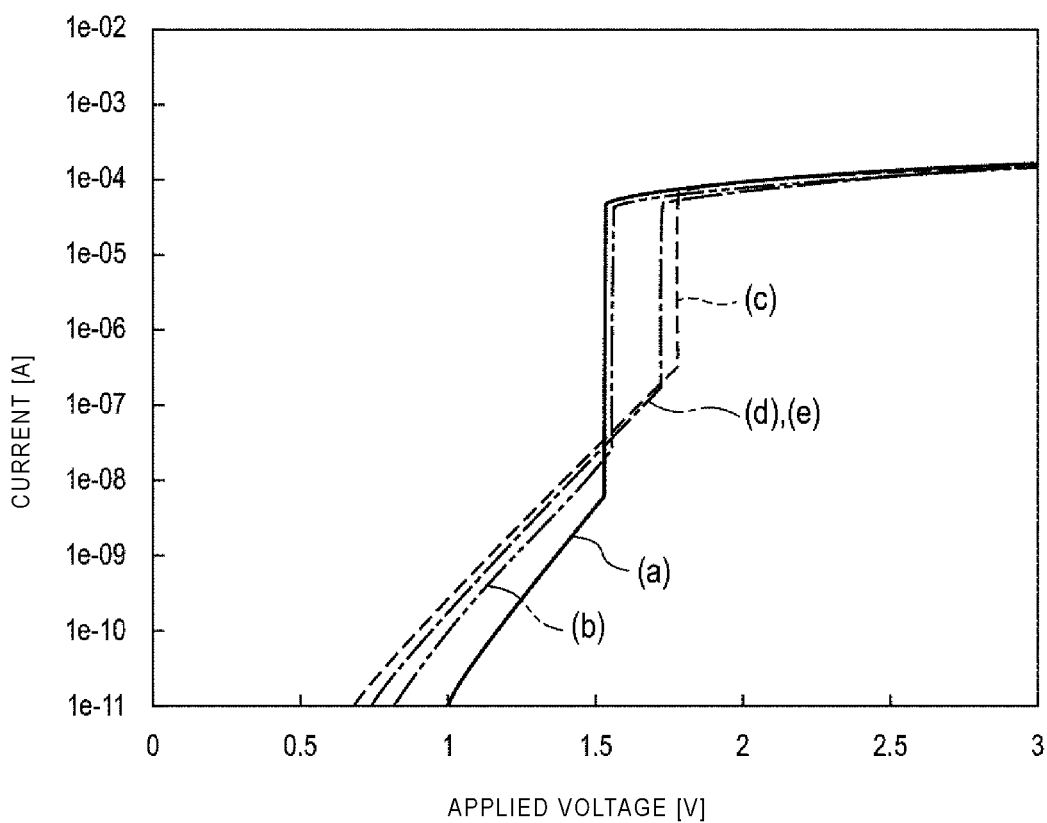
FIG. 13 is a diagram showing a relationship between the applied voltage to the memory cell and the current flowing through the memory cell when the concentration of the additional element is not uniform in a plane perpendicular to a thickness direction of a selector material layer according to the first embodiment.

FIG. 13 is a diagram showing a relationship between the applied voltage to the memory cell 30 and the current flowing through the memory cell 30 when the concentration of the additional element is not uniform in the plane perpendicular to the thickness direction of the selector material layer 53, specifically, when the concentration of the additional element decreases from the center toward the outer periphery in the radial direction of the selector material layer 53 as the sample (c) of FIG. 8B.

Figure 14:
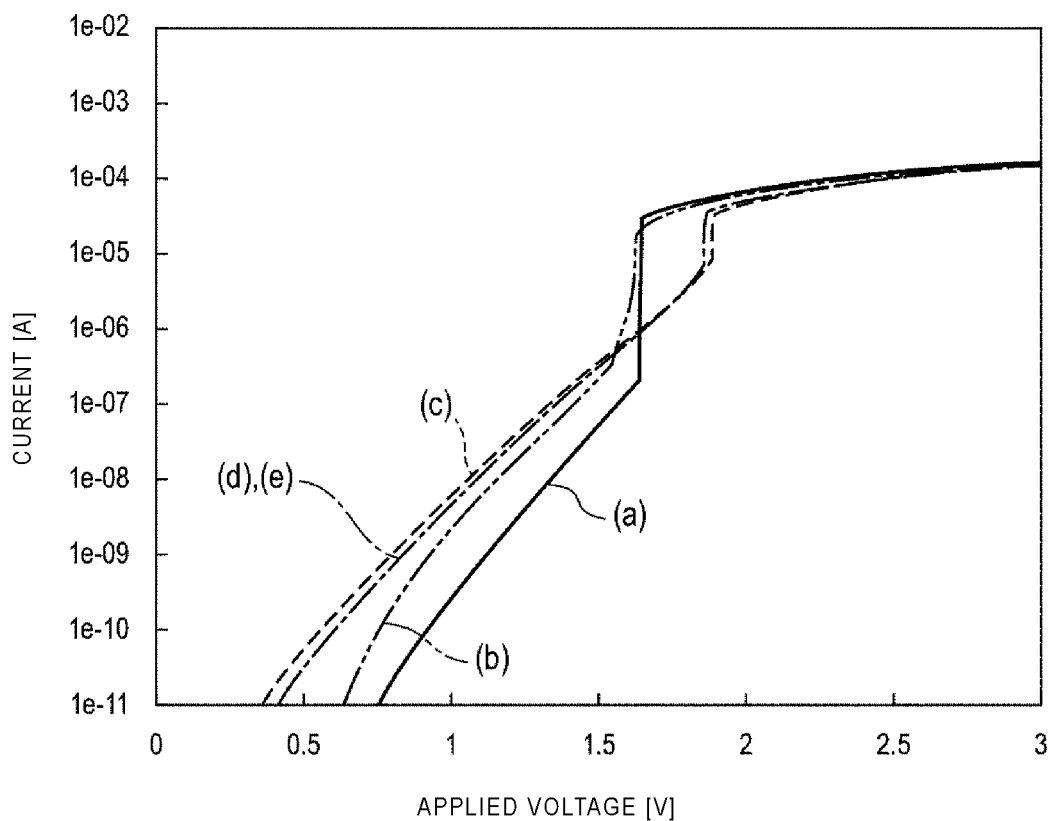
FIG. 14 is a diagram showing a relationship between the applied voltage to the memory cell and the current flowing through the memory cell when the concentration of the additional element is uniform in the plane perpendicular to the thickness direction of the selector material layer according to the first embodiment.

FIG. 14 is a diagram showing a relationship between the applied voltage to the memory cell 30 and the current flowing through the memory cell 30 when the concentration of the additional element is uniform in the plane perpendicular to the thickness direction of the selector material layer 53, that is, when the concentration distribution of the additional element is uniform in the radial direction of the selector material layer 53 as the sample (a) of FIG. 8B.

In FIGS. 13 and 14, the characteristic (a) is a case where the concentration peak of the additional element is present at the interface 54. The characteristic (b) is a case where the concentration of the additional element is higher than that of the characteristic (a) and the concentration peak of the additional element is present at the interface 54. The characteristic (c) is a case where the distance between the interface 54 and the interface 55 is d, and the concentration peak of the additional element is present at the position at which the distance from the interface 54 is d/2. The characteristic (d) is a case where the concentration peak of the additional element is present at the position at which the distance from the interface 54 is d/4. The characteristic (e) is a case where the concentration peak of the additional element is present at the position at which the distance from the interface 54 is 3d/4.

As can be seen from FIGS. 13 and 14, when the concentration of the additional element is uniform or non-uniform in the plane perpendicular to the thickness direction of the selector material layer 53, or when the concentration of the additional element in the thickness direction in the selector material layer 53 has a peak in the interface region 53a, the threshold voltage and the leak current of the memory cell 30 can be effectively reduced. For example, even when the concentration of the additional element is higher in a central portion than in an outer peripheral portion or higher in the outer peripheral portion than in the central portion in the radial direction of the selector material layer 53, the threshold voltage and the leak current of the memory cell 30 can be effectively reduced.

Second Embodiment

Next, a second embodiment will be described. Basic matters are the same as those in the first embodiment, and description of the matters described in the first embodiment is omitted.

Figure 15:
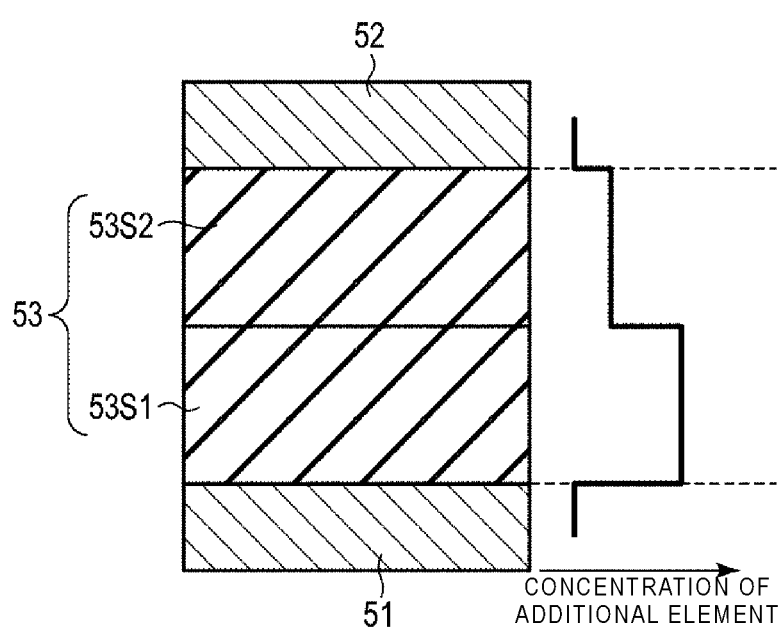
FIG. 15 is a cross-sectional view schematically showing a configuration of a selector and a diagram schematically showing concentration distribution of an additional element according to a second embodiment.

FIG. 15 is a cross-sectional view schematically showing a configuration of a selector and a diagram schematically showing concentration distribution of an additional element according to the present embodiment.

In the present embodiment, the selector material layer 53 includes a first layer portion 53S1 provided on an electrode (conductive layer) 51 side and a second layer portion 53S2 provided on an electrode (conductive layer) 52 side. That is, the selector material layer 53 includes the first layer portion 53S1 and the second layer portion 53S2 provided between the electrode 52 and the first layer portion 53S1.

A concentration of the additional element in the first layer portion 53S1 is higher than a concentration of the additional element in the second layer portion 53S2. The concentration of the additional element in the first layer portion 53S1 is substantially uniform, and the concentration of the additional element in the second layer portion 53S2 is substantially uniform. Ideally, the concentration of the additional element changes stepwise at a boundary between the first layer portion 531 and the second layer portion 53S2. However, actually, the additional element may have a concentration gradient due to diffusion or the like near the boundary between the first layer portion 53S1 and the second layer portion 53S2. Therefore, including such a case, the concentration of the additional element in the first layer portion 53S1 is substantially uniform, and the concentration of the additional element in the second layer portion 53S2 is substantially uniform.

In the present embodiment, the first layer portion 53S1 containing additional element having a relatively high concentration and the second layer portion 53S2 containing additional element having a relatively low concentration are individually formed. Specifically, after the first layer portion 53S1 containing the additional element with a relatively high concentration is deposited, the second layer portion 53S2 containing the additional element with a relatively low concentration is deposited. Alternatively, after the second layer portion 53S2 containing the additional element with a relatively low concentration is deposited, the first layer portion 53S1 containing the additional element with a relatively high concentration may be deposited.

In the present embodiment, similarly to the first embodiment, the threshold voltage and the leak current of the selector 50 can also be reduced, and a non-volatile storage device having an excellent performance can also be obtained.

Figure 16:
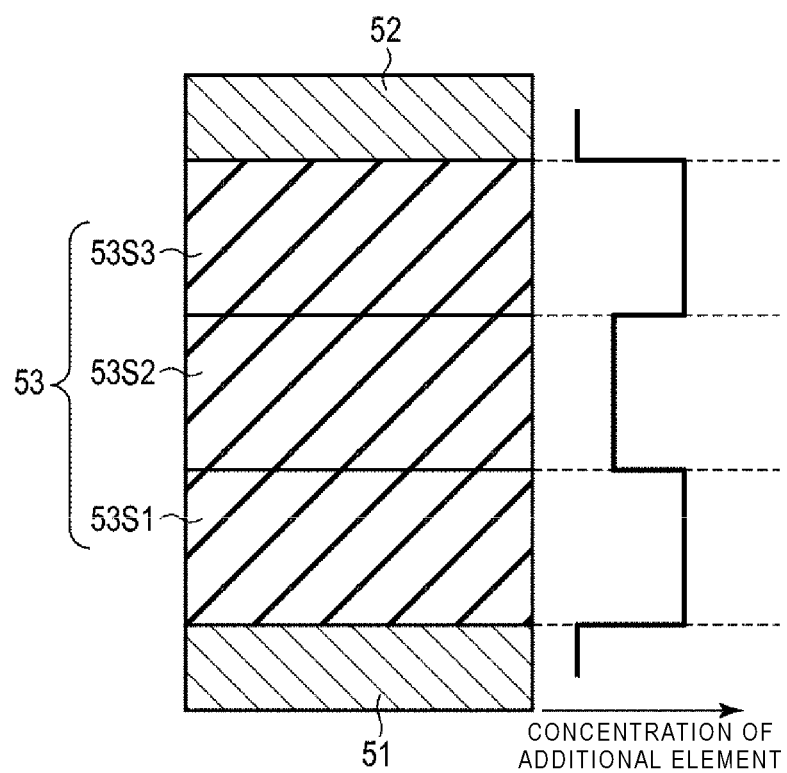
FIG. 16 is a cross-sectional view schematically showing a configuration of a modification of the selector and a diagram schematically showing the concentration distribution of the additional element according to the second embodiment.

FIG. 16 is a cross-sectional view schematically showing a configuration of a modification of the selector and a diagram schematically showing the concentration distribution of the additional element according to the present embodiment.

In the present modification, the selector material layer 53 further includes a third layer portion 533 provided between the electrode 52 and the second layer portion 53S2. A concentration of the additional element in the third layer portion 53S3 is higher than the concentration of the additional element in the second layer portion 53S2, and the concentration of the additional element in the third layer portion 53S3 is substantially uniform. The concentration of the additional element in the third layer portion 5383 may be the same as or different from the concentration of the additional element in the first layer portion 53S1.

In the present modification, the threshold voltage and the leak current of the selector 50 can be reduced as in the above embodiment.

In the first and second embodiments described above, the magnetoresistance effect element 40 is used as a variable resistance storage element, but other variable resistance storage elements in a low resistance state and a high resistance state may be used.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A switching element comprising:
   a first conductive layer;
   a second conductive layer; and
   a switching material layer provided between the first conductive layer and the second conductive layer and formed of an insulating material containing an additional element, the switching material layer including a first interface region including a first interface between the first conductive layer and the switching material layer and a second interface region including a second interface between the second conductive layer and the switching material layer, wherein
   a concentration of the additional element in the switching material layer has a first peak at a location in the first interface region that is less than one-fifth of a distance D from the first interface, where the distance D is a distance from the first interface to the second interface, and
   the concentration of the additional element in the switching material layer decreases in the first interface region and the second interface region, relative to the first peak, as a distance from a location of the first peak toward the second interface increases.

2. The switching element according to claim 1, wherein the concentration of the additional element in the switching material layer decreases in the first interface region and the second interface region, relative to the first peak, in proportion to the distance from the first interface region toward the second interface.

3. The switching element according to claim 1, wherein the first peak is at the first interface.

4. The switching element according to claim 1, wherein the first peak is in the first interface region at a location that is away from the first interface.

5. The switching element according to claim 1, wherein the first conductive layer contains an element selected from cobalt (Co), molybdenum (Mo), ruthenium (Ru), tantalum (Ta), platinum (Pt), and tungsten (W).

6. The switching element according to claim 1, wherein the concentration of the additional element in the switching material layer is not uniform in a plane perpendicular to a direction from the first conductive layer toward the second conductive layer.

7. A storage device comprising:
a switching element according to claim 1; and
a variable resistance storage element connected in series to the switching element.

8. The storage device according to claim 7, wherein the variable resistance storage element is a magnetoresistance effect element.

9. The storage device according to claim 7, further comprising:
a first wire extending in a first direction and connected to one end of a memory cell including the switching element and the variable resistance storage element; and
a second wire extending in a second direction intersecting the first direction and connected to the other end of the memory cell.

10. The storage device according to claim 7, wherein the first peak is at the first interface.

11. The storage device according to claim 7, wherein the first peak is in the first interface region at a location that is away from the first interface.

12. The storage device according to claim 7, wherein
the switching material layer further includes an intermediate region between the first interface region and the second interface region, and
a concentration of the additional element in the intermediate region is lower than the concentration of the additional element in the first interface region and lower than the concentration of the additional element in the second interface region.

13. The storage device according to claim 12, wherein the concentrations of the additional element in the first and second interface regions are each uniform.

14. A switching element comprising:
a first conductive layer;
a second conductive layer; and
a switching material layer provided between the first conductive layer and the second conductive layer and formed of an insulating material containing an additional element, wherein
the switching material layer includes a first layer portion and a second layer portion provided between the second conductive layer and the first layer portion,
a concentration of the additional element in the first layer portion is higher than a concentration of the additional element in the second layer portion, and
the concentration of the additional element in the first layer portion is uniform, and the concentration of the additional element in the second layer portion is uniform.

15. The switching element according to claim 14, wherein
the switching material layer further includes a third layer portion provided between the second conductive layer and the second layer portion, and
a concentration of the additional element in the third layer portion is higher than the concentration of the additional element in the second layer portion, and the concentration of the additional element in the third layer portion is uniform.

16. The switching element according to claim 14, wherein the insulating material includes any one of a material containing silicon (Si) and oxygen (O), a material containing zirconium (Zr) and oxygen (O), and a material containing silicon (Si) and nitrogen (N).

17. The switching element according to claim 14, wherein the additional element is selected from germanium (Ge), arsenic (As), antimony (Sb), bismuth (Bi), titanium (Ti), tungsten (W), argon (Ar), xenon (Xe), and krypton (Kr).

18. A switching element comprising:
a first conductive layer;
a second conductive layer; and
a switching material layer provided between the first conductive layer and the second conductive layer and formed of an insulating material containing an additional element, the switching material layer including a first interface region including a first interface between the first conductive layer and the switching material layer, a second interface region including a second interface between the second conductive layer and the switching material layer, and an intermediate region between the first interface region and the second interface region, wherein
a concentration of the additional element in the switching material layer has a first peak in the first interface region, and
a concentration of the additional element in the intermediate region is lower than the concentration of the additional element in the first interface region and lower than the concentration of the additional element in the second interface region.

19. The switching element according to claim 18, wherein the concentration of the additional element in the switching material layer has a second peak in the second interface region.

20. The switching element according to claim 19, wherein the concentration of the additional element in the switching material layer has a minimum at an intermediate location in the intermediate region, and decreases continuously along locations in the intermediate region extending from the first interface region toward the intermediate location and along locations in the intermediate region extending from the second interface region toward the intermediate location.

* * * * *